United States Patent
Conklin

(10) Patent No.: US 9,469,260 B2
(45) Date of Patent: Oct. 18, 2016

(54) VEHICLE NON-DRIVER OCCUPANCY DETECTOR WITH IGNITION KEY LOCKING SAFETY DEVICE

(71) Applicant: Patricia Conklin, Cape Coral, FL (US)

(72) Inventor: Patricia Conklin, Cape Coral, FL (US)

( * ) Notice: Subject to any disclaimer, the term of this patent is extended or adjusted under 35 U.S.C. 154(b) by 101 days.

(21) Appl. No.: 14/551,268

(22) Filed: Nov. 24, 2014

(65) Prior Publication Data

US 2016/0144824 A1    May 26, 2016

(51) Int. Cl.
*C08B 1/00* (2006.01)
*B60R 16/023* (2006.01)

(52) U.S. Cl.
CPC .................................. *B60R 16/023* (2013.01)

(58) Field of Classification Search
CPC ....................................................... B60R 25/04
USPC .............................. 340/425.5, 438, 457, 667
See application file for complete search history.

(56) References Cited

U.S. PATENT DOCUMENTS

| | | |
|---|---|---|
| 3,845,261 A | 10/1974 | Blinkilde |
| 5,260,684 A | 11/1993 | Metzmaker |
| 5,949,340 A | 9/1999 | Rossi |
| D452,833 S | 1/2002 | Ito et al. |
| 6,847,302 B2 | 1/2005 | Flanagan et al. |
| 7,123,157 B2 | 10/2006 | Best |
| 7,567,181 B1 | 7/2009 | Davison |
| 7,994,906 B2 | 8/2011 | Salazar |
| 2005/0072249 A1 | 4/2005 | Maeda et al. |
| 2007/0268119 A1 | 11/2007 | Cram et al. |

*Primary Examiner* — Jeffery Hofsass

(57) ABSTRACT

A vehicle occupancy key locking safety device prevents shutting off a vehicle while persons are detected as occupying rear seats of the vehicle. The device includes a vehicle having a non-driver seat and an ignition dependent on a key to shut of the vehicle. A sensor is coupled to the vehicle such that the sensor detects occupancy of the non-driver seat. A key locking mechanism is coupled to the ignition of the vehicle The key locking mechanism is operationally coupled to the sensor such that the key locking mechanism is actuated preventing shutting the vehicle off while the non-driver seat is occupied as detected by the sensor.

9 Claims, 3 Drawing Sheets

VEHICLE NON-DRIVER OCCUPANCY DETECTOR WITH IGNITION KEY LOCKING SAFETY DEVICE

BACKGROUND OF THE DISCLOSURE

Field of the Disclosure

The disclosure relates to safety devices and more particularly pertains to a new safety device for preventing shutting off a vehicle while persons are detected as occupying rear seats of the vehicle.

SUMMARY OF THE DISCLOSURE

An embodiment of the disclosure meets the needs presented above by generally comprising a vehicle having a non-driver seat and an ignition dependent on a key to shut of the vehicle. A sensor is coupled to the vehicle such that the sensor detects occupancy of the non-driver seat. A key locking mechanism is coupled to the ignition of the vehicle The key locking mechanism is operationally coupled to the sensor such that the key locking mechanism is actuated preventing shutting the vehicle off while the non-driver seat is occupied as detected by the sensor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
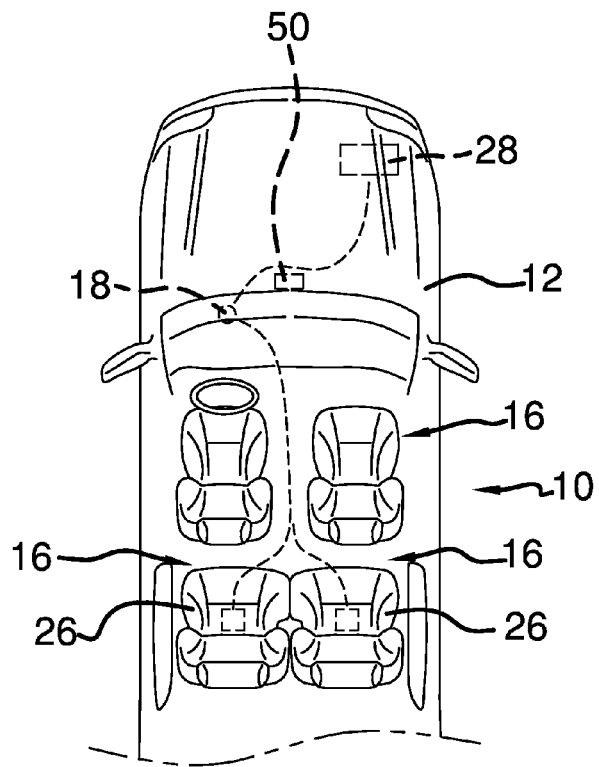
FIG. 1 is a top view of a vehicle occupancy key locking safety device according to an embodiment of the disclosure.
Figure 2:
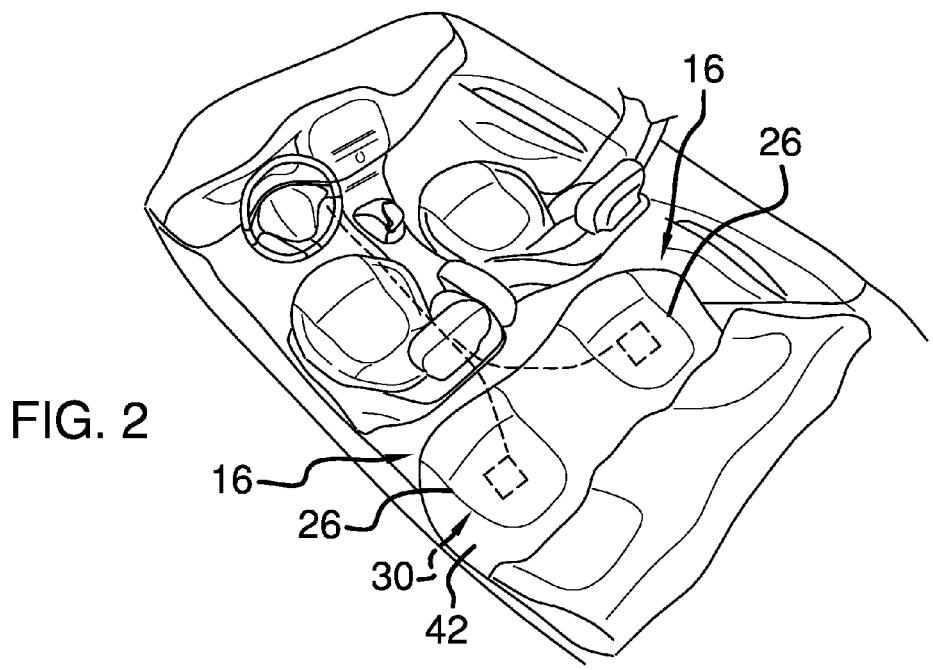
FIG. 2 is a top rear side perspective view of an embodiment of the disclosure.
Figure 3:
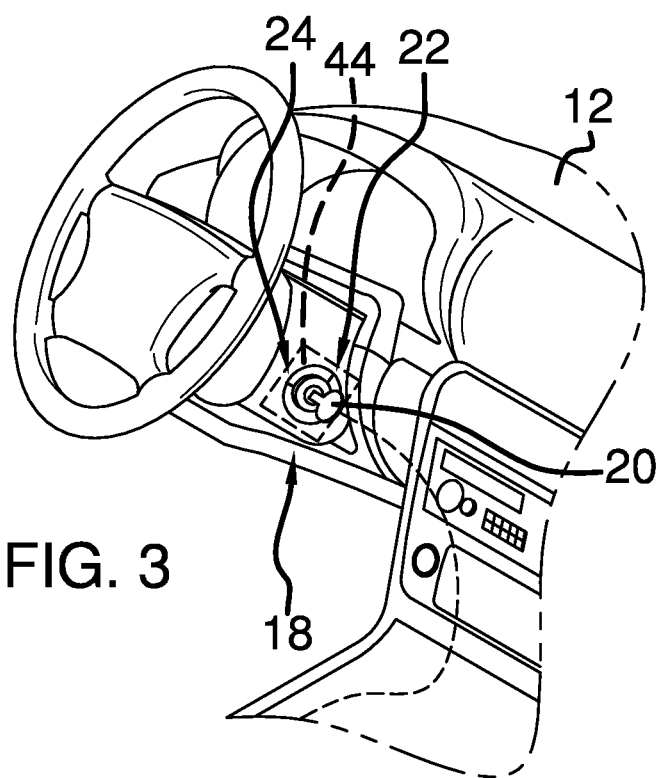
FIG. 3 is a partial top rear side perspective view of an embodiment of the disclosure.
Figure 4:
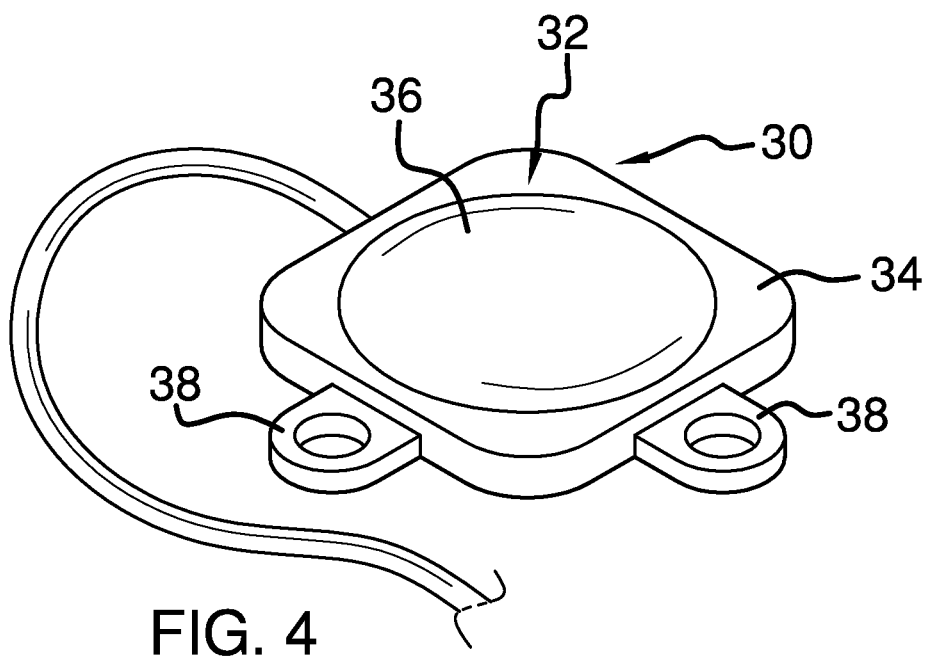
FIG. 4 is a top front side perspective view of a sensor of an embodiment of the disclosure.
Figure 5:
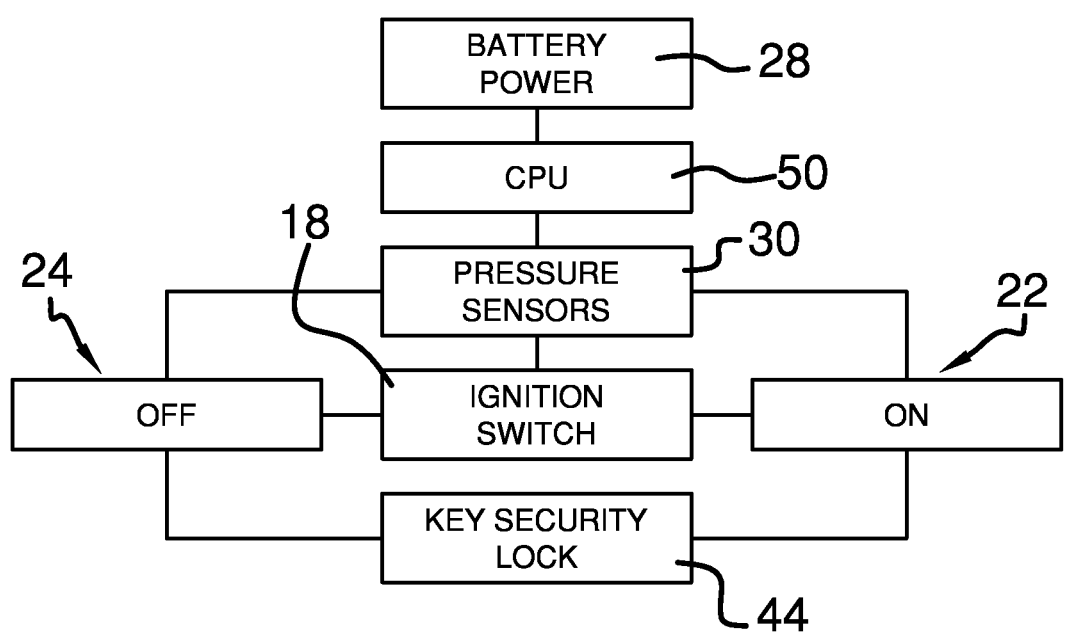
FIG. 5 is a schematic view of an embodiment of the disclosure.

With reference now to the drawings, and in particular to FIGS. 1 through 5 thereof, a new safety device embodying the principles and concepts of an embodiment of the disclosure and generally designated by the reference numeral 10 will be described.

As best illustrated in FIGS. 1 through 5, the vehicle occupancy key locking safety device 10 generally comprises a vehicle 12 having a plurality of non-driver seats 16 and an ignition 18. The ignition 18 is of the type dependent on a key 20 being turned between a run position 22 and an off position 24 to shut off the vehicle 12. Thus, the vehicle 12 remains running, including any air conditioning or heating systems activated, until the key 20 is turned from the run position 22 to the off position 24. Each non-driver seat 16 may be a respective rear seat 26 within the vehicle 12. There may be a single row of rear seats 26 in the vehicle 12 or the vehicle may be of the type having a plurality of rows, each comprising one or more rear seats 26. The vehicle 12 also is of the type having a battery 28 used to start an engine or initiate running of the vehicle 12.

Each of a plurality of sensors 30 is coupled to the vehicle 12 such that each sensor 30 detects occupancy of an associated one of the non-driver seats 16. Each sensor 30 is a pressure sensor 32 having a base 34 and a pressure sensitive button section 36. Apertured flanges 38 may extend from the base 34 to facilitate coupling of the sensor 30 within a bottom section 42 of the associated non-driver seat 16.

A key locking mechanism 44 is coupled to the ignition 18 of the vehicle 12. The key locking mechanism 44 inhibits turning of the key 20 to the off position 24 to shut off the vehicle 12 while the key locking mechanism 44 is actuated. The key locking mechanism 44 is operationally coupled to each sensor 30 such that the key locking mechanism 44 is actuated while any one non-driver seat 16 is occupied as detected by the associated sensor 30. The key locking mechanism 44 may provide a conventional mechanical obstruction to turning of the key 20.

A processor 50 is coupled to the vehicle 12. Each sensor 30 is communicatively coupled to the processor 50. The key locking mechanism 44 is operationally coupled to the processor 50 such that the key locking mechanism 44 is actuated by the processor 50. Thus, the key locking mechanism 44 may permit physical turning of the key 20 while preventing such turning from shutting off the vehicle 12. The processor 50 is electrically coupled to the battery 28. Each sensor 30 is electrically coupled to the battery 28 through the processor 50 and the key locking mechanism 44 is also electrically coupled to the battery 28 through the processor 50.

In use, the device 10 is passive in that it acts to prevent shutting off the vehicle 12 while occupancy of any non-driver seat 16 is detected. Thus, a driver cannot inadvertently leave a child or pet in the vehicle 12 unless the vehicle 12 remains running.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle occupancy key locking safety device comprising:
   a vehicle having a non-driver seat and an ignition dependent on a key turned between a run position and an off position to shut of said vehicle whereby said vehicle remains running until said key is turned from said run position to said off position;
   a sensor coupled to said vehicle such that said sensor detects occupancy of said non-driver seat;
   a key locking mechanism, said key locking mechanism being coupled to said ignition of said vehicle, said key locking mechanism inhibiting turning of said key to said off position while said key locking mechanism is actuated; and
   wherein said key locking mechanism is operationally coupled to said sensor such that said key locking mechanism is actuated while said non-driver seat is occupied as detected by said sensor.

2. The device of claim 1, further comprising said sensor being a pressure sensor.

3. The device of claim 1, further comprising said non-driver seat being a rear seat within said vehicle.

4. The device of claim 1, further comprising a processor, said processor being coupled to said vehicle, said sensor being communicatively coupled to said processor, said key locking mechanism being operationally coupled to said processor such that said key locking mechanism is actuated by said processor.

5. The device of claim 4, further comprising said vehicle having a battery, said processor being electrically coupled to said battery.

6. The device of claim 5, further comprising said sensor being electrically coupled to said battery through said processor.

7. The device of claim 5, further comprising said key locking mechanism being electrically coupled to said battery through said processor.

8. The device of claim 1, further comprising:
   said vehicle having a plurality of said non-driver seats; and
   said sensor being one of a plurality of said sensors coupled to said vehicle, each said sensor detecting occupancy of an associated one of said non-driver seats.

9. A vehicle occupancy key locking safety device comprising:
   a vehicle having a plurality of non-driver seats and an ignition dependent on a key turned between a run position and an off position to shut off said vehicle whereby said vehicle remains running until said key is turned from said run position to said off position, each said non-driver seat being a respective rear seat within said vehicle, said vehicle having a battery;
   a plurality of sensors, each said sensor being coupled to said vehicle such that each said sensor detects occupancy of an associated one of said non-driver seats, each said sensor being a pressure sensor;
   a key locking mechanism, said key locking mechanism being coupled to said ignition of said vehicle, said key locking mechanism inhibiting turning of said key to said off position while said key locking mechanism is actuated, wherein said key locking mechanism is operationally coupled to each said sensor such that said key locking mechanism is actuated while any said non-driver seat is occupied as detected by said associated sensor; and
   a processor, said processor being coupled to said vehicle, each said sensor being communicatively coupled to said processor, said key locking mechanism being operationally coupled to said processor such that said key locking mechanism is actuated by said processor, said processor being electrically coupled to said battery, each said sensor being electrically coupled to said battery through said processor, said key locking mechanism being electrically coupled to said battery through said processor.

* * * * *